United States Patent
Bensberg et al.

(10) Patent No.: US 11,550,485 B2
(45) Date of Patent: Jan. 10, 2023

(54) PAGING AND DISK STORAGE FOR DOCUMENT STORE

(71) Applicant: SAP SE, Walldorf (DE)

(72) Inventors: Christian Bensberg, Heidelberg (DE); Steffen Geissinger, Wiesloch (DE)

(73) Assignee: SAP SE, Walldorf (DE)

(*) Notice: Subject to any disclaimer, the term of this patent is extended or adjusted under 35 U.S.C. 154(b) by 246 days.

(21) Appl. No.: 15/959,821

(22) Filed: Apr. 23, 2018

(65) Prior Publication Data
US 2019/0324676 A1    Oct. 24, 2019

(51) Int. Cl.
G06F 3/06 (2006.01)
G06F 12/1009 (2016.01)
G06F 16/13 (2019.01)
G06F 16/11 (2019.01)

(52) U.S. Cl.
CPC .......... *G06F 3/0643* (2013.01); *G06F 3/0604* (2013.01); *G06F 12/1009* (2013.01); *G06F 16/128* (2019.01); *G06F 16/13* (2019.01)

(58) Field of Classification Search
CPC ........ G06F 16/10; G06F 16/13; G06F 16/128; G06F 3/0643; G06F 3/0604; G06F 12/1009; G06F 16/134; G06F 16/182
See application file for complete search history.

(56) References Cited

U.S. PATENT DOCUMENTS

| | | | | |
|---|---|---|---|---|
| 6,088,773 A * | 7/2000 | Kano | .................. | G06F 11/1407 711/146 |
| 7,337,295 B2 * | 2/2008 | Von Bergen | ........ | G06F 16/2246 707/999.205 |
| 2005/0165750 A1 * | 7/2005 | Shakib | .................... | G06F 16/31 707/999.003 |
| 2007/0078848 A1 * | 4/2007 | Sareen | .................. | G06T 3/4038 707/999.003 |
| 2010/0121865 A1 * | 5/2010 | Vaid | .................. | G06F 16/90335 707/758 |
| 2010/0153415 A1 * | 6/2010 | Muntz | ................. | G06F 16/1858 707/758 |
| 2012/0136901 A1 * | 5/2012 | Raatikka | ................. | G06F 16/22 707/797 |
| 2015/0067265 A1 * | 3/2015 | Waldspurger | ....... | G06F 12/0862 711/135 |
| 2019/0005089 A1 * | 1/2019 | Kempf | .................. | G06F 16/248 |
| 2019/0073372 A1 * | 3/2019 | Venkatesan | .......... | G06F 16/128 |

* cited by examiner

*Primary Examiner* — Ashish Thomas
*Assistant Examiner* — Jedidiah P Ferrer
(74) *Attorney, Agent, or Firm* — Buckley, Maschoff & Talwalkar LLC

(57) ABSTRACT

Provided are systems and methods for paging data into main memory from checkpoint data stored on disk. In one example, the method may include one or more of receiving a request for a database record in main memory, determining whether the database record has been previously stored in the main memory, in response to determining that the database record has been previously stored in the main memory, identifying a slice where the database record was stored from among a plurality of slices included in the main memory, and paging content of the identified slice including a copy of the requested database record into the main memory from a snapshot captured of content included in the identified slice and previously stored on disk. Accordingly, documents can be paged into main memory on-demand from snapshots of slice content rather than paging an entire partition of content.

16 Claims, 7 Drawing Sheets

FIG. 6

600 

```
┌─────────────────────────────────────────┐
│ Receiving a Request for a Database Record in Main │ ← 610
│ Memory                                   │
└─────────────────────────────────────────┘
                    ↓
┌─────────────────────────────────────────┐
│ Determining Whether the Database Record has been │ ← 620
│ Previously Stored in Main Memory        │
└─────────────────────────────────────────┘
                    ↓
┌─────────────────────────────────────────┐
│ In Response to the Database Record being Previously │ ← 630
│ Stored in Main Memory, Identifying a Slice where the │
│ Database Record was Previously Stored   │
└─────────────────────────────────────────┘
                    ↓
┌─────────────────────────────────────────┐
│ Paging the Identified Slice into Main Memory from a │ ← 640
│ Backup Copy of the Identified Slice Previously │
│ Backed-up on Disk                       │
└─────────────────────────────────────────┘
```

PAGING AND DISK STORAGE FOR DOCUMENT STORE

BACKGROUND

A document database, also referred to as a document store, differs significantly from a traditional relational database (RDB). Relational databases generally store data in separate tables that are defined by a database administrator, in which data of a single data object may be spread across several tables. Meanwhile, document databases can store all information for a given object in a single database instance, and each stored object can differ from other stored objects. In other words, there may be no internal structure that maps directly onto the concept of a table, and the fields and relationships generally don't exist as predefined concepts. Instead, all of the data for an object is placed in a single document, and stored in the document database as a single entry. This makes mapping objects into the document database a simple task, normally eliminating anything similar to an object-relational mapping. Accordingly, a document store is attractive for programming web applications, which are subject to continual change in place, and where speed of deployment is an important issue.

Paging is a memory management process by which a computer stores and retrieves data from a secondary storage (i.e., disk) for use in main memory (i.e., RAM), Typically, an operating system retrieves data from the secondary storage in same-sized blocks which are referred to as pages. A program begins execution with none of its pages in main memory. As the program requests data from the main memory, page faults occur triggering the operating system to find and transfer the page to main memory. During this process, the operating system must identify a location of the page on disk, obtain an empty page frame from the main memory, load the page to the available page frame, update a page table to refer to the new page frame, and return control of to the program. However, identifying a location of the page on disk can take significant time for a large database systems which often include multiple database nodes requiring the operating system to search each node for the requested page. Furthermore, database paging typically loads an entire partition of a database into main memory even when only a small fraction of data from the partition is being requested by the program. Accordingly, what is needed is a more efficient way of paging data into main memory of a database such as a document store.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 6 is a diagram illustrating a method for paging in data from disk in accordance with an example embodiment.

Figure 1:
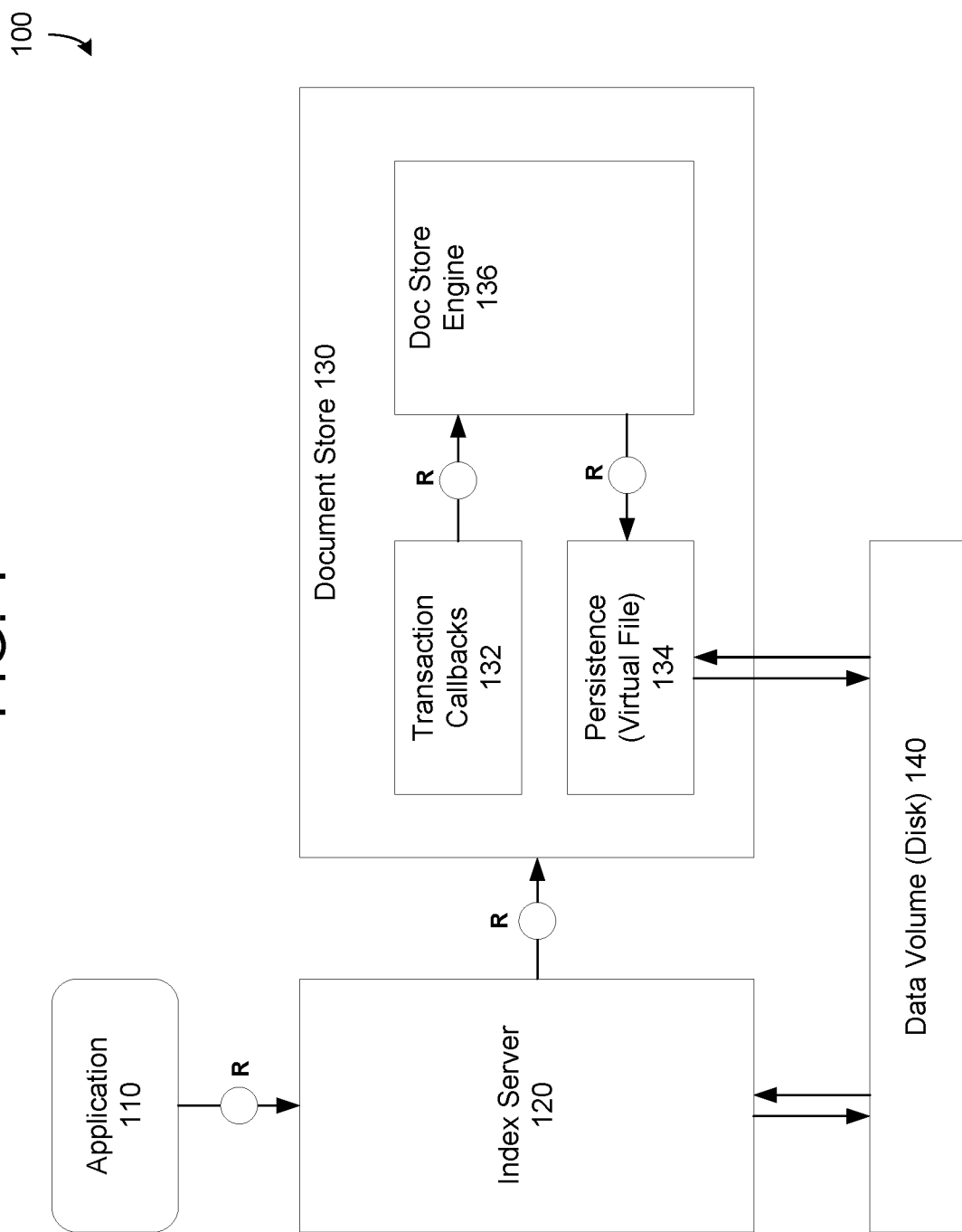
FIG. 1 is a diagram illustrating a database computing architecture including a document store in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a system and method for paging data into and paging data out of main memory using a snapshot (e.g., disk copy) of the data previously stored on disk during a checkpoint process. The snapshot may also be referred to as a checkpoint and may include a copy of memory contents stored in a slice of main memory at a point in time. In various examples, the main memory may be a document store of a database system, however, embodiments are not limited thereto. The data store (main memory) may be implemented via a plurality of data partitions which each include a plurality of slices of memory. At various intervals of time, data points (referred to as checkpoints) of data stored in the memory slices may be captured and copied to disk as part of a larger database operation. The checkpoints may be used for backup and recovery, loading and unloading, restarting, and the like, for a partition of memory. The snapshot of data included in the checkpoint along with a trimmed log file may be used to recover the partition of memory to its current state on a slice-by-slice basis in the event of a power loss, a restart, a load, or the like.

The example embodiments take advantage of the checkpoint process by paging data into main memory from disk using snapshots of individual slices of data previously stored as checkpoints. The data may be paged back into main memory on-demand from a snapshot of a slice of data previously captured in response to data requests from a client application, or the like. That is, rather than load an entire partition of data during a paging process, the example embodiments can load data previously stored in a single slice of a partition from a disk copy (also referred to as a checkpoint) of the slice contents previously stored on disk, extract necessary data from the slice content, and remove the slice content from main memory. Accordingly, the database system and method significantly improve the efficiency of memory usage during a paging-in and paging-out process because the system does not page in an entire partition of memory content but instead pages in a slice of memory content. Furthermore, the example embodiments improve upon the speed at which data is identified and moved from disk to main memory through an index which may be local to the partition and which may store record identifiers of each database record stored in each slice.

A database may continuously receive and process database operations (also referred to as transactions) such as read, write, modify, delete, select, and the like. At any given time, a large database system can be simultaneously processing many different transactions. Therefore, simply taking a snapshot of the database at a particular point in time is not an effective way of backing up the database because transactions in the middle of being performed, as well as transactions out of order, unseen, aborted but not cleared, and the like, can be missed. Rather, the database system herein may store a copy of content from a data block (such as a slice of memory) on disk as a checkpoint along with a partial log file that keeps track of any transaction that is not fully visible to the system. The log can be trimmed significantly to reduce the amount of re-processing of transactions while also preserving only those transactions that are not fully visible thereby enabling the system to be restored in a more efficient (faster) process.

Within the document store, data may be organized in main memory (also referred to as in-memory) and may have a document format such as a JavaScript Object Notation (JSON) document model format or an internal binary representation thereof. The document store may include a collection that is broken up into a plurality of data partitions and each partition may be organized into a plurality of slices. Checkpoints may be performed on memory content in slices of the main memory and stored on disk on a slice-by-slice basis thereby reducing the level of complexity. Each slice may include its own log file that is kept and modified by the database as transactions occur on the respective slice. When a checkpoint request is received, the system may store a copy/snapshot of data stored in the slice and a trimmed the log file corresponding to the slice, to disk. By persisting the snapshot of the slice content as well as the trimmed log file, the slice content can be loaded significantly faster than related load processes because only the log transactions in the trimmed log need to be performed rather than all transactions in the log before the loss occurred. When a checkpoint exists, the backup size of the data is smaller and recovery is faster. Furthermore, the burden to replay the log during any type of load of a collection, not just backup and recovery, is significantly improved as a result of the trimmed log file.

In addition, the example embodiments take advantage of the checkpoint process and use checkpoint data for paging in requested data from cold storage. The example embodiments may page-in and page-out data on a slice-by-slice basis via an index which may be local to the partition and keep records of data in all slices included within the partition. The index can identify a particular slice of main memory where the requested database record was stored, and use check-pointed data of content included in the identified slice which is persisted on disk as data for paging. The checkpoint data points are previously captured of main memory contents and are managed on a more refined scale via memory slices rather than managing and paging in entire partitions of content to main memory.

FIG. 1 illustrates a database computing architecture 100 in accordance with an example embodiment. Referring to FIG. 1, the architecture 100 includes an application 110 that interacts with an index server 120 for processing client/application requests. The index server 120 manages a document store 130 which may be an in-memory data structure such as dynamic random access memory (DRAM) or the like storing client data. The index server 120 and the document store 130 may both store data to disk 140. For example, the document store 130 may store checkpoints to disk 140, in response to the system requesting a checkpoint operation. Also, the document store 130 may be recovered based on checkpoint data stored in disk 140 in the event of a power loss or other failure.

The database computing architecture 100 may be incorporated within a database system such as an in-memory, column-oriented, relational database management system that functions as a database server to store and retrieve data as requested by software applications. The database system may combine both online analytical processing (OLAP) and online transaction processing (OLTP) operations into a single system. The database system may store data in main memory (e.g., document store 130) rather than on disk 140 which provides for faster data access, and by extension, faster querying and processing. The document store 130 may be an additional data store besides a column store and a row store (not shown). Here, the document store 130 may be an independent store that can interact with either of the column store and the row store for data storage.

In the example of FIG. 1, the index server 120 may perform session management, authorization, transaction management and command processing. Although shown as separate components in the example of FIG. 1, in some cases, the index server 120 may include the document store 130 as the engines for processing the data. The client application 110 may submit structured query language (SQL) and multidimensional expression (MDX) statements to the index server 120 in the context of authenticated sessions and transactions which may be executed on data included in the document store 130 as well as other data stores. The index server 100 also manages persistence between cached memory images of database objects, log files and permanent storage files.

To work on the database, a client may design the application 110 using a design of their choice. A connection and session management process may be performed by the index server for creating and managing database clients and the corresponding applications such as client application 110. Once a session is established, client application 110 can communicate with the database using SQL statements, for example. For each session a set of parameters may be maintained such as auto-commit, current transaction isolation level, etc. Also, users may be authenticated either by the database itself (login with username and password) or authentication can be delegated to an external authentication providers such as an LDAP directory.

Client requests may be analyzed and executed by the index server 120. For example, incoming SQL requests may be routed to an SQL processor of the index server. Data manipulation statements may be executed by the SQL processor. As another example, other types of requests may be delegated to other components. For example, data definition statements may be dispatched to a metadata manager, transaction control statements may be forwarded to a transaction manager, planning commands may be routed to a planning engine and procedure calls may be forwarded to a stored procedure processor. An SQL statement may be processed in the context of a transaction. New sessions may be implicitly assigned to a new transaction. The transaction manager may coordinate database transactions, controls transactional isolation and keeps track of running and closed transactions. When a transaction is committed or rolled back, the transaction manager informs the involved engines (e.g., document store 130, column store, row store, etc.) about this event so they can execute necessary actions. The transaction manager also cooperates with a persistence layer of the index server to store data to disk 140 to achieve atomic and durable transactions.

Metadata can be accessed via the metadata manager component of the index server 120. In the database, metadata may include a variety of objects, such as definitions of relational tables, columns, views, indexes and procedures. Metadata of all these types may be stored in one common database catalog for all stores. The database catalog may be stored as tables in row store. The features of the database such as transaction support and multi-version concurrency control, are also used for metadata management.

The index server 120 may support different data stores (i.e., different engines) such as a document store 130, a column store, and a row store, and the like. As described herein, a store is a sub-system of the database which includes in-memory storage, as well as the components that manages that storage. For example, a row store may be a database row-based in-memory relational data engine. Meanwhile, a column store may store tables column-wise. The document store 130 (also referred to as a JSON document store) may store documents in the form of collections. The need to store unstructured data such as social media, multimedia, etc. has grown rapidly. SQL meanwhile requires structure to be specified in advance which means that any changes to the information schema require time-consuming alter statements to run on a table. The document store 130 overcomes this issue by loosening the restrictions on database schema and allows data to be grouped together more logically and naturally. In the document model, each record and its associated data is through of as a "document."

In the document store 130, all data related to a database object is encapsulated together. As a result, documents are independent units which make performance better and make it easier to distribute data across multiple servers while preserving locality. Furthermore, application logic is easier to write because no translation is needed between objects in an application and SQL queries. Rather, the object model can be turned directly into a document. Also, unstructured data can be stored easily since a document may contain whatever keys and values the application logic requires. The callback transaction layer 132 may receive requests from the index server 120 and process those requests on content stored in the document store engine 136.

The document store 130 may also include a persistence layer 134 which provides data persistency to disk 140. Like a traditional database, page management and logging may be performed by the persistence layer 134. According to various embodiments, the changes made to the in-memory database pages may be persisted through checkpoints. Checkpoints may be written to data volumes on the persistent storage 140 for which the storage medium is hard drives. All transactions committed in the database are stored/saved/referenced by a logger (not shown in the figure) of the persistence layer 134 in a log entry written to the disk 140 on the persistent storage. To get high I/O performance and low latency, log volumes may use flash technology storage.

Furthermore, the persistence layer 134 is responsible for durability and atomicity of transactions. This layer ensures that the database is restored to the most recent committed state after a restart or other loss and that transactions are either completely executed or completely undone. To achieve this in an efficient way, the persistence layer 134 uses a combination of checkpoints and trimmed logs.

When the application 110 requests a database record such as a specific document from the index server 120, the index server 120 may transmit a request to the document store 130. In response, the document store 130 may identify whether the document was previously stored in the document store. If the document is not currently stored in the main memory but has been previously stored in the main memory, there should be a checkpoint of a slice of memory contents which include the document stored on disk. To retrieve the document from checkpoint data, the document store 130 may identify a partition and a slice of memory within the partition where the document was stored (e.g. by using an index), and use this identification to retrieve the document from checkpoint data stored on disk 140 during a paging-in process to the document store 130.

Figure 2:
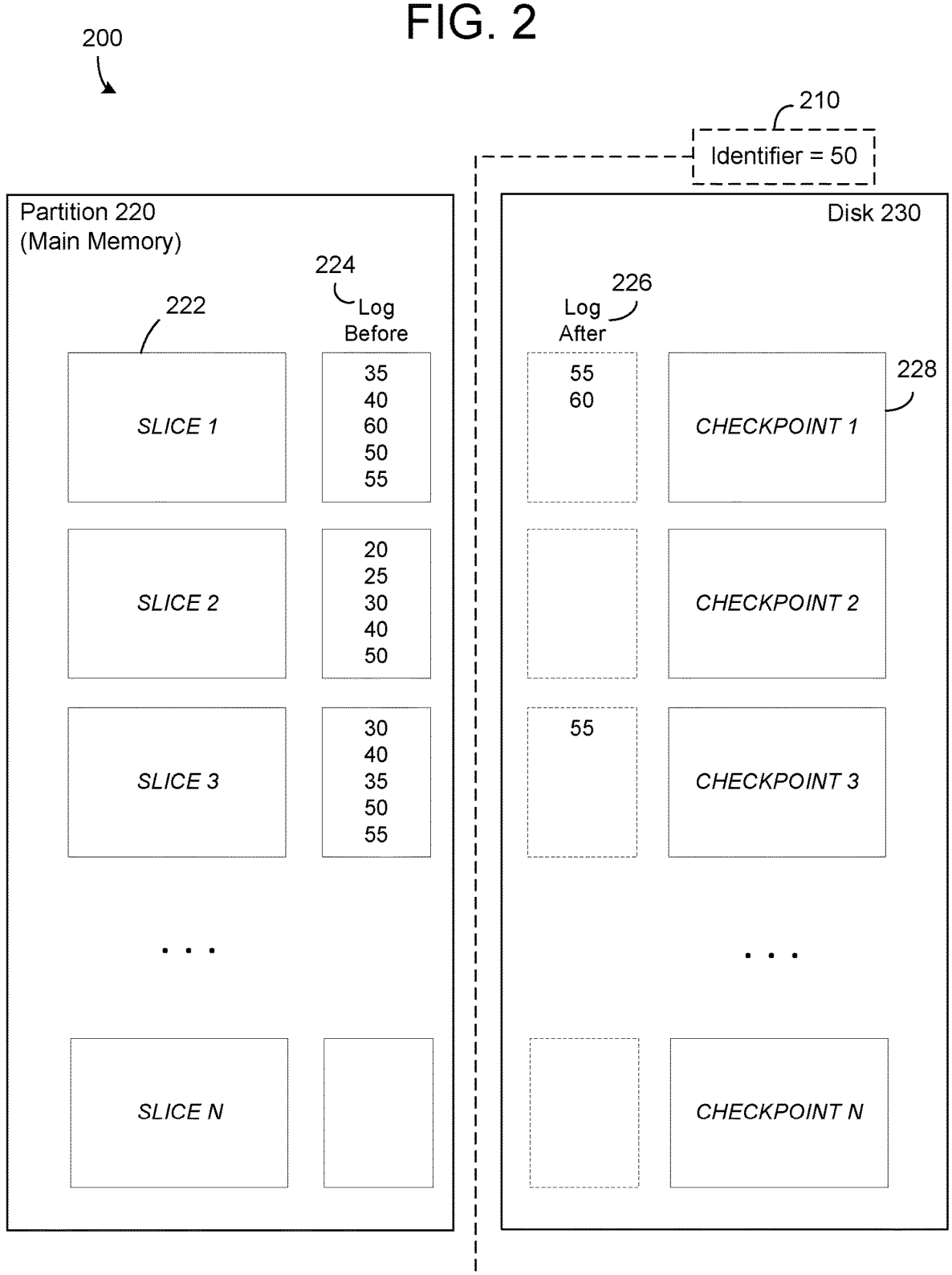
FIG. 2 is a diagram illustrating a process of generating and storing a checkpoint in accordance with an example embodiment.

FIG. 2 illustrates a process 200 of generating and storing a checkpoint. For example, the process 200 may be performed by a document store such as document store 130 shown in FIG. 1. As another example, the process 200 may be performed by a different type of data store such as a column store, a row store, or another computing system connected to a data store. In this example, a checkpoint operation is performed on a slice-by-slice basis among a plurality of slices which are included in a partition of data. Memory contents of each slice from a partition 220 is backed-up on disk 230 in the form of a checkpoint which is a copy of the data (also referred to as a snapshot) from the slice at a particular point in time. In addition, a log file of a respective slice is trimmed to remove records of transactions having results that are being persisted in the checkpoint. The checkpoint process may be performed in response to a database request which may occur at periodic intervals, automatically in response to system determination, randomly, and the like. After the data is check-pointed, should the database crash, lose power, have a restart, or any other load, the checkpoint data from disk 230 may be retrieved and used to reconstruct the stored contents of the main memory 220 to a current state before the crash/power loss.

To perform the checkpoint process, the database system may generate a minimum timestamp represented by timing identifier 210. The minimum timestamp is determined by the database and represents a time after which one or more transactions are not visible, for example, because those transactions are still processing, have been aborted, need to be cleaned through a garbage collection process, or the like. Meanwhile, transactions having a timestamp before or equal to the minimum timestamp included in the timing identifier 210 are visible to all transactions and the results thereof can be safely check-pointed to disk. In this example, what is currently residing in a slice of memory (same block) is copied to disk as a checkpoint and the log file is cleaned up or otherwise trimmed to remove transactions which have results stored in the checkpoint. Accordingly, when the system needs to reload a slice, a checkpoint copy on disk may be loaded into the in-memory in one shot making the reload process significantly more efficient than scanning through the log file and re-applying old operations (insert, update, delete, etc.) the data. Previous operations (insert, update, delete, etc.) from the trimmed log must be replayed/ re-applied. But given that it has been trimmed, its volume is lower and therefore the overall load time shorter than without checkpoints.

In the example of FIG. 2, a checkpoint operation is performed on N slices of the partition 220 of main memory. In this example, a slice of memory 222 has a log file before 224 representing a record of all transactions occurring on the slice of memory 222 when the timing identifier 210 is received. This log is represented in the example of FIG. 2 using timestamps of the most recent transactions. For example, an ID of 35 refers to a timestamp of 35, but this number may be arbitrary. All transactions with a read timestamp less than or equal to the timing identifier 210 may be removed from the log 224 because those transactions are visible to every transaction currently pending and have results which are correctly stored in the slice 222. Accordingly, the timing identifier 210 may be referred to as a minimum read timestamp. The log before 224 the checkpoint is trimmed to the log after 226 based on the minimum read timestamp included in the timing identifier 210. In addition, contents of the slice 222 visible to all transactions may be stored as a snapshot on disk as a checkpoint 228. Prior to copying the contents of the slice to disk 230 as checkpoint 228, the results of any transactions still in the log (log after 226) may be undone or otherwise removed from the contents of the slice 222. The log after 226 may also be stored with the checkpoint 228 (or as part of the checkpoint) and can be used to reconstruct only those transactions left in the log 226. Therefore, the accurate memory contents can be restored without having to execute the entire transaction log. In the example of FIG. 2, the timing identifier 210 (minimum read timestamp) issued by the database is a timestamp of 50. The timing identifier 210 may be included in a checkpoint request. In this case, the slice of memory 222 has a log before 224 representing a record of all transactions occurring on the slice of memory 222. During the checkpoint process, all transactions with a read timestamp less than or equal to the timing identifier 210 may be removed from the log because those transactions are visible to every transaction currently pending. As a result, the log before 224 the checkpoint is trimmed to the log after 226 based on the timing identifier 210. In addition, a copy/snapshot of the data included in the slice 222 may be stored on disk as a checkpoint 228. Here, the data may be copied from the slice and stored to disk with or without a compression process. Meanwhile, the log after 226 may also be stored with the checkpoint 228 (or as part of the checkpoint) and can be used to reconstruct only those transactions which are not visible to all transactions when the checkpoint request is received. Therefore, the accurate memory contents can be restored without having to execute the entire transaction log.

In some embodiments the minimum read timestamp is used to define the snapshot of what is included in the checkpoint. In these embodiments the minimum read timestamp may define data that is "fixed" in the sense that all transactions may see it, all post-processing (like garbage collection) has been executed on it and all data may be accessed without locking etc. In alternative embodiments, checkpoints are being created using higher timestamps, for example equal to the highest commit ID in the system. Accessing the data may require further steps, like acquiring locks to prevent parallel processing of the data, checks whether the data has been deleted (and is therefore subject to garbage collection) or the like.

Referring again to FIG. 2, the slice 222 includes data from transactions in the log after file 226 corresponding to timestamps 55 and 60. Should a restart occur (or other reload operation), these transactions are going to be re-executed from the log after file 226. Therefore, this data may be removed from the slice representation prior to storing the checkpoint onto disk. In other words, results of database operations generated by the transactions at timestamps 55 and 60 may be undone or otherwise removed from the slice and not persisted at all, for example due to a transaction rollback. Accordingly, the transactions will not be performed redundantly when the log after 226 is read and used to reconstruct the memory slice 222.

As described herein, checkpoints correspond to a dump of memory to disk, while removing all the entries from the log file that have been written to disk. As a result, the log file only preserves the transactions having a read timestamp after the timing identifier because results of these transactions are not visible to all transactions at the time of the checkpoint and therefore are not stored as part of the checkpoint. One of the benefits of trimming the log file is that the system does not have to read the log anymore because you can use the checkpoint to reconstruct a slice of memory. The log before and the log after plus the checkpoint contents must result in the same representation in memory. The goal of the checkpoint is to clear the log as much as possible. The log and the checkpoint are written to disk. These are the two things to reconstruct the document store slice. To reload, just load the checkpoint and then apply the operations in the log after without having to reapply all transactions like in a save point.

Figure 3A:
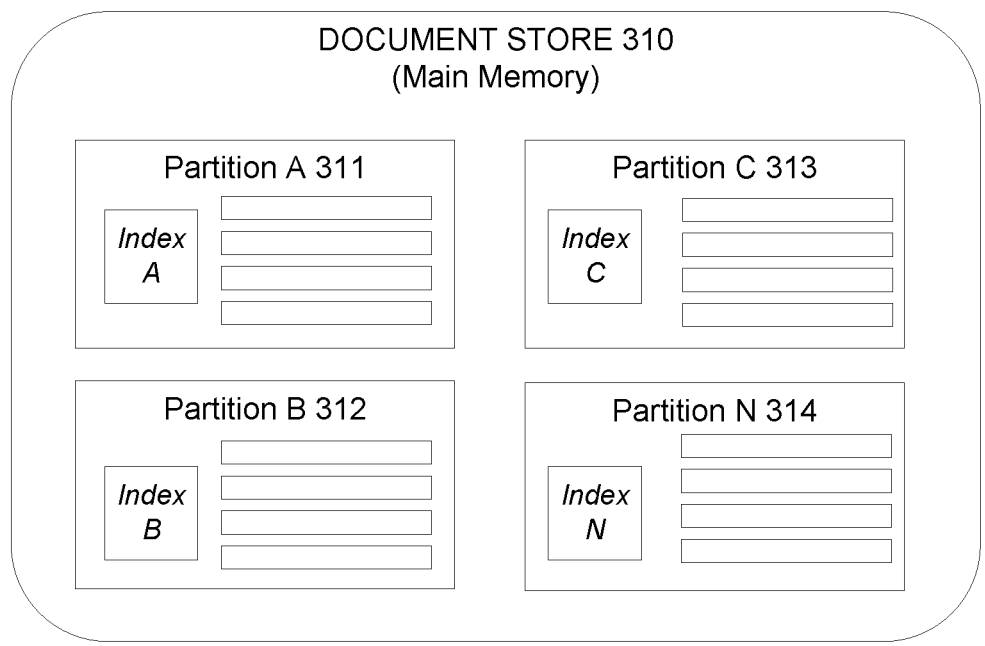
FIG. 3A is a diagram illustrating a document store architecture in accordance with an example embodiment.
Figure 3B:
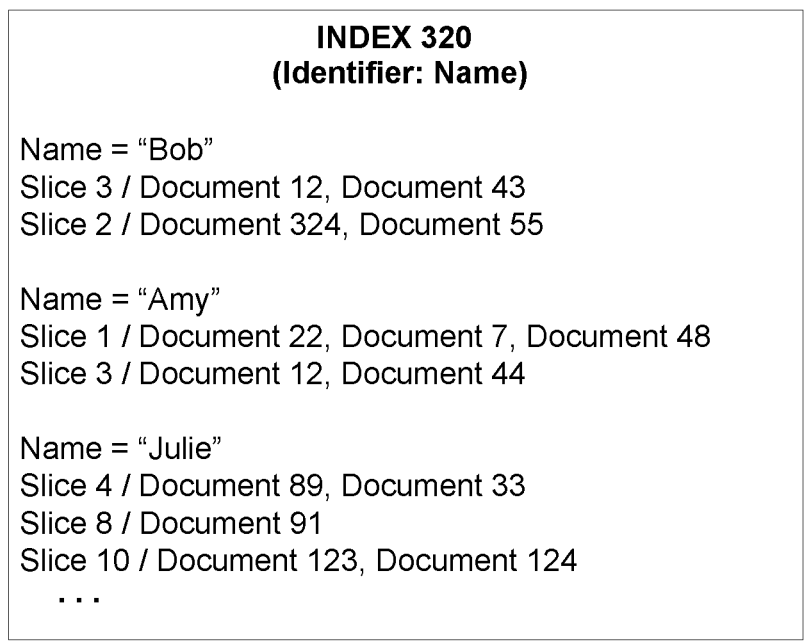
FIG. 3B is a diagram illustrating an index of a partition included in a document store in accordance with an example embodiment.

FIG. 3A illustrates a document store architecture in accordance with an example embodiment, and FIG. 3B illustrates an index that may be included within a partition of a document store. Referring to FIG. 3A, document store 310 may include a collection data structure that is organized in a plurality of partitions 311, 312, 313, and 314. Each of the partitions 311-314 may be organized into a plurality of slices. Each time a new document is accessed by the main memory 310, the document may be stored in a slice of a partition (or multiple slices depending on a size of the document). Documents may be assigned unique document IDs by the database and may be recorded within metadata of the document. When a first slice within a partition is filled with document data, a next slice in the partition may be used to store documents. This process may continue until each slice within a partition is full. In some examples, the partitions are managed such that each partition has a similar amount of data stored therein so as not to overload a particular partition.

Each of the partitions 311-314 may include its own index 320 as shown in FIG. 3B. The index 320 may maintain a record of each document stored in a partition and a slice (or slices) in which the document is stored within the partition. Each slice may provide only a fraction of the total storage capacity of a partition. In some embodiments, there is an index per identifier in a document that is frequently used in order to find requested documents. Below is an example of a document with two identifiers including "name" and "city." Meanwhile, values for the identifiers are "Tom" and "Frankfurt."

```
{
    "name": "Tom",
    "city": "Frankfurt"
}
```

In this example, an index may be created for the identifier "name" for fast lookups when querying for a name. Likewise, another index could be created for the identifier "city." The index "name" will have a value of "Tom" (or a hash value) and the index will point to all documents (e.g., by slice and/or document ID) that include "Tom" as a value for "name." The index name could also store other values (e.g., Amy, Julie, etc.) as well as pointers to the locations within a partition where the documents are located that have those values.

The index may be built in a way that it stores all values for the chosen identifier and a reference to the slice or slices in which the value is stored such as shown in the non-limiting example of FIG. 3B. Typically, techniques like hashing are employed to reduce the memory size of an index. This may cause false positives though. As a non-limiting example, a slice of memory may include 32 MB, 64 MB, or the like. Upon changes to the data contents of a slice a redo record is persisted. Over time, a consolidated representation of the data of the slice is written, known as the checkpoint. The redo log is being truncated accordingly. All changes to the data of the slices are immediately reflected in the index of the corresponding partition. This way the index is always up to date and its "freshness" is not bound to the checkpointing process. As the index is updated before a transaction commits, other transactions may actually use the index to get references to documents that they may not see due to their transactional state. Each document is equipped with header information that includes a transaction control block. Using the transaction control block it can be decided whether a document is visible to a given transaction. This means that a transaction may use an index, find a reference to a document that may match, load the corresponding slice from disk but then decide not to touch the actual document data based on the header information and its own transactional view. In some embodiments, there is no unnecessary load operation though as the system does not actively unload slices if there are open transactions that have modified a slice. In other words, when a slice is being loaded from disk, typically all documents are also visible to all transactions. This is different though if the document store process has crashed before, but the other database processes have not. Then the document store recovers, but there may be active transactions with an old transactional view. This may cause that an index points to a document, requires the load of the slice but then detects that the document is not visible. The index 320 provides a mechanism for locating a document in disk based on a slice of main memory where the document was previously stored and from where it was stored to disk. The index 320 may always remain in main memory even when the slices of data are stored on disk and removed from the main memory to make room for other data.

The index 320 can filter requests for paging data and tell the system that either YES, the data was previously stored in a partition, and the slice where it was stored, or NO the document has not been previously stored in main memory. In doing so, only the relevant slice of data needs to be paged into the main memory rather than a whole partition of data. Every record such as a document may be assigned a unique ID that contains a slice number and the index 320 may store the unique IDs which tells the database where each document is located. When a query for a database record such as a document comes into the index 320, the index 320 may identify the slice where the document record was stored, and the database may load the data of the slice, extract the data, and unload the slice back to disk. Another option is that the database may keep data from some slices in memory for a period of time. The database may include a resource container which tracks when slices of data where accessed (LRU) and can keep certain slices of data in memory. Also a garbage collection process can trim out the slices of data from main memory. Furthermore, a checkpoint of the slice of data can be written to disk.

The index 320 can have different index implementations. For example, the index can keep a record of all values (database records, documents, etc.) in memory which have been indexed (large index). As another example, the index 320 can store a sorted list (many deltas) which is a sorted list. As another example, the index 320 can do a binary search and find the values quite quickly, while keeping a full list of index values in memory. As another example, the index may keep a hash map of the records which is smaller in size but needs to be maintained to prevent false positives. Furthermore, the index 320 may keep or otherwise store statistics on each slice level such as minimum value, maximum value, etc., which can help the database filter out many queries quickly.

Figure 4:
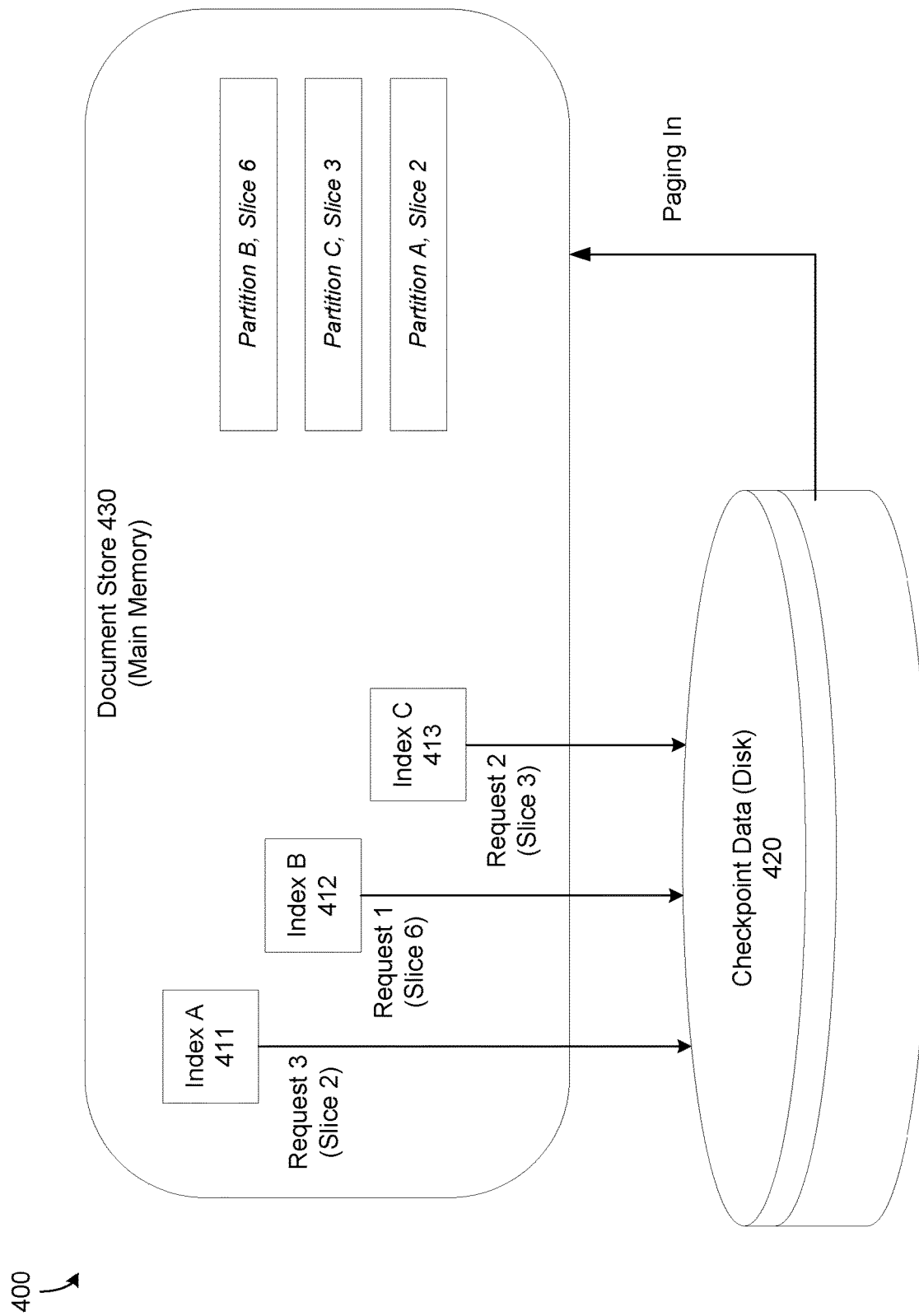
FIG. 4 is a diagram illustrating a process of paging in data to main memory from a checkpoint, in accordance with an example embodiment.

FIG. 4 illustrates a process 400 of paging in data to main memory 430 from disk 420, in accordance with an example embodiment. In this example, data is paged into main memory 430 from checkpoint data which is previously stored on disk 420 based on data content captured from a snapshot of the slice performed while the data was present within slices of a partition of memory of the main memory 430. In this example, three requests are received for paging in documents to main memory 430. In response, to receiving a request, the database may determine whether the documents have been previously stored in the main memory (document store 430). In particular, each request may identify a document by document ID and slice ID. Accordingly, the database may identify a partition of the document store associated with the document ID and a slice within the partition from among a plurality of slices where the document was stored.

In this example, a first request is for a document that was previously stored in partition B of the document store 430. Accordingly, the first request may be routed to index B 412 corresponding to partition B of the document store 430. The index B 412 may identify a slice of memory of the partition B which held data previously backed-up within checkpoint data on disk 420, and the database may page data from the identified slice into the main memory (Partition B, Slice 6). In this example, a second request is for a document that was previously stored in partition C of the document store 430. Accordingly, the second request is routed to index C 413 corresponding to partition C of the document store 430. The index C 413 may identify a slice of memory of the partition C which where the document was stored and which was previously stored within checkpoint data on disk 420 and which includes the requested document, and the database may page the identified slice of data into main memory (Partition C, Slice 3). Meanwhile, a third request is for a document that was previously stored in partition A of the document store 430. Accordingly, the third request is routed to index A 411 corresponding to partition A of the document store 430. The index A 411 may identify a slice of memory of the partition A which stored the data before it was previously stored within checkpoint data on disk 420 and which includes the requested document, and the database may page data from the identified slice into main memory (Partition A, Slice 2).

According to various embodiments, an index may store a record between document IDs and slices of memory within the partition of the index where the documents were stored. Even when the database record is no longer present in main memory, a history of where the document was stored may be maintained by the index which is always in main memory. Accordingly, a link between a requested database record and a disk copy (or snapshot) of the database record can be achieved using the index of a partition which is always in main memory despite the database record being flushed or otherwise removed from main memory to disk. Furthermore, slices of data may be paged into main memory from disk on-demand rather than paging in an entire partition of memory contents. As a result, the data can be more finely paged-in form disk.

Figure 5:
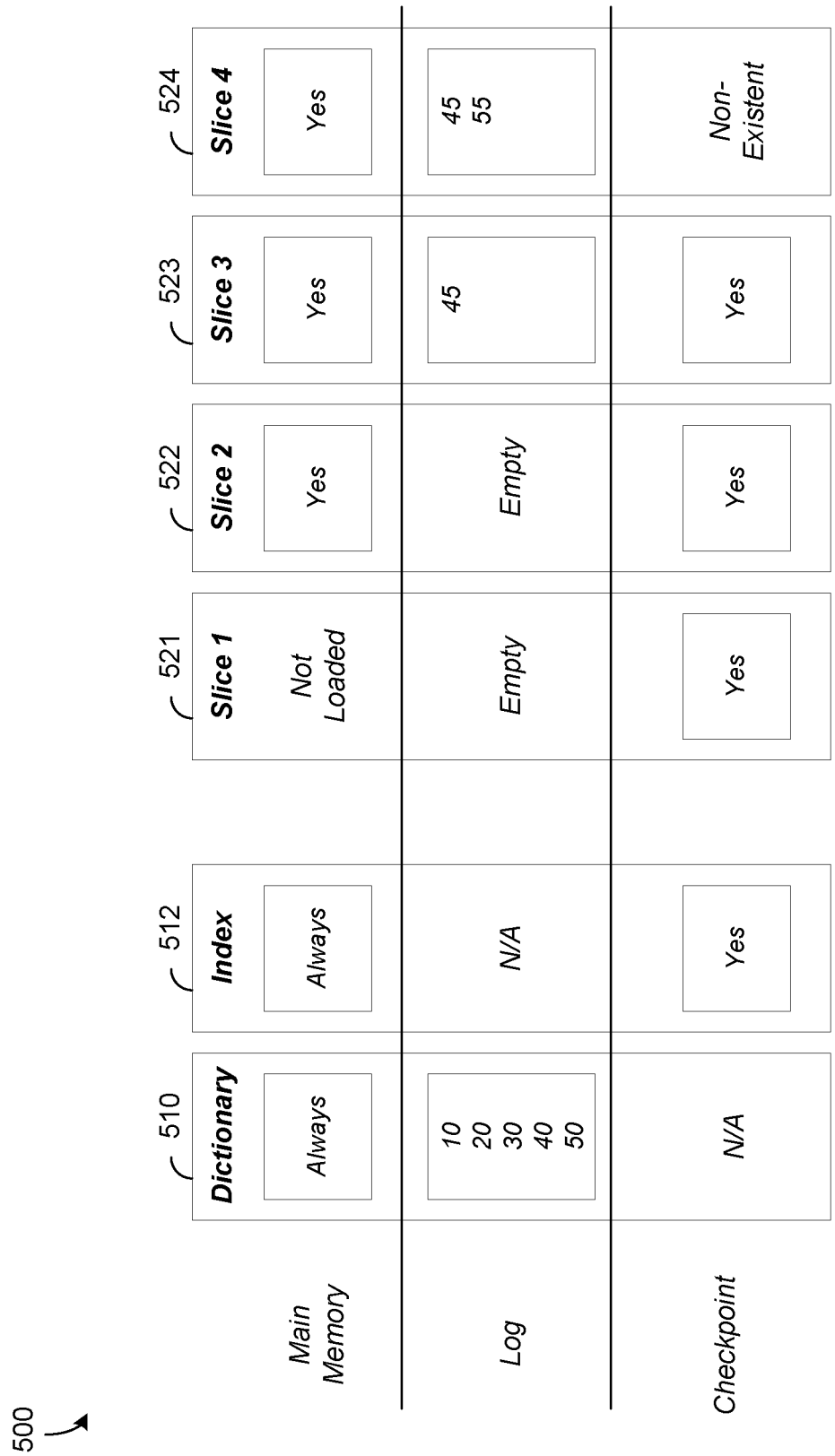
FIG. 5 is a diagram illustrating a loading status of a plurality of slices of a partition in accordance with an example embodiment.

FIG. 5 illustrates a status of a plurality of slices of a partition 500 in accordance with an example embodiment. In this example, a dictionary 510 and an index 512 may be always stored in main memory. However, data from slices 521-522, 523, and 524 may be copied and transferred from main memory to disk in the form of a checkpoint. In this example, a first slice 521 includes content that has been stored as a checkpoint but does not include content in main memory and also does not include a log file. Meanwhile, a second slice 522 includes both a checkpoint of the content from the slice as well as the same content currently loaded in the main memory. Here, the content may be stored within the slice of the main memory. Also, a third slice 523 includes both a checkpoint of previous content from the slice as well as content currently stored in the slice. Here, the log file indicates a difference between the content currently stored in the slice and the content that has been stored as a checkpoint on disk. Meanwhile, the fourth slice 524 includes currently content in the slice and a full transactional log, but the content has not been check-pointed.

FIG. 6 illustrates a method 600 for generating and storing a database checkpoint in accordance with an example embodiment. As an example, the method 600 may be performed by a database node included within a distributed database system. As another example, the method 600 may be performed by a computing device such as a server, a cloud platform, a computer, a user device, and the like. In some examples, the method 600 may be performed by a plurality of devices in combination. Referring to FIG. 6, in 610, the method may include receiving a request for a database record in main memory. For example, the database record may include a request for a document having a document model format and the main memory may include a document store. As another example, the database record may include another type of database record such as a tabular data record having rows and/or columns of data, and the like. The request may be provided from a client application, an index server, a transactional manager of a document store, and the like.

In 620, the method may include determining whether the database record has been previously stored in the main memory, and in 630, in response to determining that the database record has been previously stored in the main memory, identifying a slice where the database record was stored from among a plurality of slices included in the main memory. The disk copy of the identified slice may be a snapshot of content in the slice that was previously stored in a partition of the main memory that includes the plurality of slices. Here, each slice may have its own checkpoint (copy) that is stored to disk and that can be used to page-in data from the respective slice. Accordingly, the paging-in process can be performed on a slice-by-slice scale and on-demand rather than paging-in an entire partition of data.

In some embodiments, the request may include a document identifier that uniquely identifies the database record, and the identifying may include identifying the slice from among the plurality of slices based on the document identifier. The identifying may be performed via an index associated with a partition including the plurality of slices. The index may store a mapping between database records and slices such that only a slice (or slices) including the database record can be loaded into main memory rather than the entire partition.

In 640, the method may include paging the identified slice including a copy of the requested database record into the main memory from a snapshot of the identified slice previously backed-up on disk. The paging process may include retrieving the snapshot of the identified slice from disk and loading the snapshot into the main memory. Here, the paging may include loading, into the main memory, the snapshot of only the identified slice from among snapshot copies of other slices among the plurality of slices included in the partition. In some embodiments, the snapshot of the identified slice may be loaded into the main memory from a checkpoint of the identified slice previously stored on disk. In some embodiments, the method may further include extracting the requested database record from the paged-in snapshot of the identified slice, and paging out the snapshot of the identified slice from the main memory back to disk.

Meanwhile, if the method determines that the database record has not been previously stored in the main memory, the database may attempt to page the database record into disk through a less efficient process of scanning cold storage of the database and searching for the database record. However, this process may require more than just a slice to be paged into main memory but may require an entire partition to be paged into memory thereby reducing available storage space in main memory.

Figure 7:
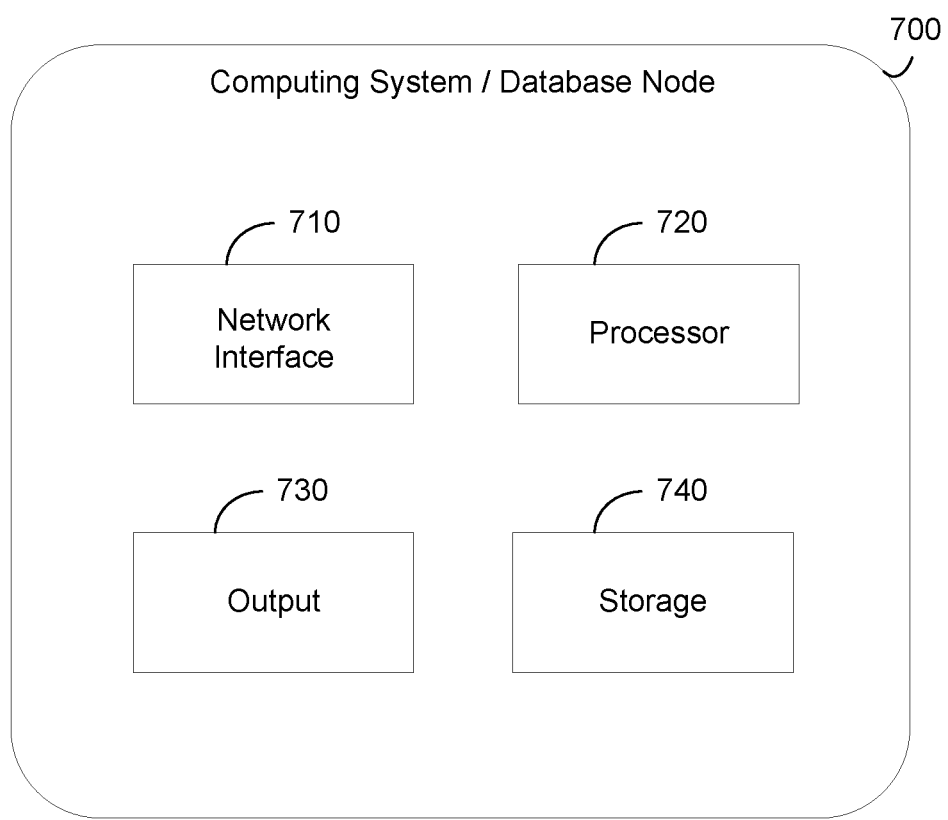
FIG. 7 is a diagram illustrating a computing system in accordance with an example embodiment.

FIG. 7 illustrates a computing system 700 that can generate and store checkpoints, in accordance with an example embodiment. For example, the computing system 700 may be a database node, a server, a cloud platform, a user device, or the like. In some embodiments, the computing system 700 may be distributed across multiple devices. Referring to FIG. 7, the computing system 700 includes a network interface 710, a processor 720, an output 730, and a storage device 740 such as an in-memory. Although not shown in FIG. 7, the computing system 700 may also include or be electronically connected to other components such as a display, an input unit, a receiver, a transmitter, a persistent disk, and the like. The processor 720 may control the other components of the computing system 700.

The network interface 710 may transmit and receive data over a network such as the Internet, a private network, a public network, an enterprise network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or it may be reconfigurable. The output 730 may output data to an embedded display of the computing system 700, an externally connected display, a display connected to the cloud, another device, and the like. For example, the output 730 may include a port, an interface, a cable, a wire, a board, and/or the like, with input/output capabilities. The network interface 710, the output 730, or a combination thereof, may interact with applications executing on other devices. The storage device 740 is not limited to a particular storage device and may include any known memory device such as RAM, NRAM, ROM, hard disk, and the like, and may or may not be included within the cloud environment. The storage 740 may store software modules or other instructions which can be executed by the processor 720 to perform the method 600 shown in FIG. 6.

According to various embodiments, the storage 740 includes a main memory such as RAM, NRAM, DRAM, or the like. The main memory may include one or more data stores such as a document data store, a column data store, a row data store, and the like. The processor 720 may receive a request for a database record. The request may be received from an index server, a client application executing and accessing data from the database, and/or the like. The processor 720 may determine whether the database record has been previously stored in the main memory, and in response to a determination that the database record has been previously stored in the main memory, identify a slice where the database record was stored from among a plurality of slices included in the main memory. The processor 740 may page the identified slice including a copy of the requested database record into the main memory of storage 740 from a snapshot of the identified slice previously backed-up on disk. Here, the disk may be included in the storage 740 or it may be connected to the computing system 700 remotely (via a network), externally (via a cable, etc.), or the like.

In some embodiments, the snapshot of the identified slice may be previously stored in a partition of the main memory that includes the plurality of slices. In this example, the processor 720 may load, into the main memory, the snapshot of the identified slice only from among disk copies of other slices among the plurality of slices included in the partition. The main memory may be a document store. In this example, the request may include a document identifier that uniquely identifies a document database record, and the processor 720 may identify the slice from among the plurality of slices based on the document identifier. In some embodiments, the processor 720 identifies the slice where the database record was stored from among the plurality of slices included in the main memory via an index associated with a partition including the plurality of slices. In some embodiments, the processor 720 may page the snapshot of the identified slice into the main memory from a checkpoint of the identified slice previously stored on disk. The processor 720 may extract the requested database record from the paged-in snapshot of the identified slice, and page out the snapshot of the identified slice from the main memory.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a main memory that comprises a plurality of partitions, where each partition from among the plurality of partitions comprises its own local index; and
   a processor configured to
       capture snapshots of data stored at a plurality of slices of memory within a partition of the main memory during a checkpoint operation of a database on the main memory and store the captured snapshots on disk,
       delete the data stored at the plurality of slices of memory within the partition of the main memory including a database record;
       after deletion of the data, receive a request for the database record, the request comprising a query term that is recited in the database record,
       identify a local index of the partition in the main memory associated with the database record from among a plurality of local indices of the partition based on an identified type of the query term,
       identify a slice within the partition where data of the database record was stored prior to its deletion from among the plurality of slices included in the partition, where the slice is identified based on a value of the query term that is paired with a slice identifier of the slice within an entry of the identified local index of the respective partition, and
       restore, into the main memory, previously deleted data of a snapshot of only the identified slice from among the captured snapshots of the data stored at the plurality of slices previously captured and stored on disk during the checkpoint operation of the database.

2. The computing system of claim 1, wherein the snapshot of the identified slice comprises a copy of the slice content previously stored in the identified partition of the main memory.

3. The computing system of claim 1, wherein the requested database record comprises a document and the main memory comprises a document store.

4. The computing system of claim 1, wherein each local index from among the plurality of local indices is dedicated to a different type of query term identifier.

5. The computing system of claim 1, wherein the processor is further configured to store copies of respective log files of the slices of memory within the captured snapshots during the checkpoint operation of the database on the main memory.

6. The computing system of claim 1, wherein the processor is further configured to extract the requested database record from the paged-in content of the snapshot of the identified slice, and page out the content of the snapshot of the identified slice from the main memory.

7. The computing system of claim 1, wherein the processor is configured to page the snapshot of the identified slice into the main memory based on one or more unique document identifiers that are paired with the value of the query term and the slice identifier in the local index of the respective partition.

8. A method comprising:
capturing snapshots of data stored at a plurality of slices of memory within a partition of the main memory during a checkpoint operation of a database on the main memory and store the captured snapshots on disk;
deleting the data stored at the plurality of slices of memory within the partition of the main memory including a database record;
after deletion of the data, receiving a request for the database record in a main memory that comprises a plurality of partitions, where each partition from among the plurality of partitions comprises its own local index, and the request comprises an identifier of a query term that is recited in the database record;
identifying a local index of the partition in the main memory associated with the database record from among a plurality of local indices of the partition based on an identified type of the query term;
identifying a slice within the partition where data of the database record was stored prior to its deletion from among the plurality of slices included in the partition, where the slice is identified based on a value of the query term that is paired with a slice identifier of the slice within an entry of the identified local index of the respective partition; and
restoring, into the main memory, previously deleted data of a snapshot of only the identified slice from among the captured snapshots of the data stored at the plurality of slices previously captured and stored on disk during the checkpoint operation of the database.

9. The method of claim 8, wherein the snapshot of the identified slice comprises a copy of the slice content previously stored in the identified partition of the main memory.

10. The method of claim 8, wherein the requested database record comprises a document and the main memory comprises a document store.

11. The method of claim 8, wherein each local index from among the plurality of local indices is dedicated to a different type of query term identifier.

12. The method of claim 8, wherein the method further comprises storing copies of respective log files of the slices of memory within the captured snapshots during the checkpoint operation of the database on the main memory.

13. The method of claim 8, further comprising extracting the requested database record from the paged-in snapshot of the identified slice, and paging out the snapshot of the identified slice from the main memory.

14. A non-transitory computer-readable storage medium storing program instructions that when executed cause a processor to perform a method comprising:
capturing snapshots of data stored at a plurality of slices of memory within a partition of the main memory during a checkpoint operation of a database on the main memory and store the captured snapshots on disk;
deleting the data stored at the plurality of slices of memory within the partition of the main memory including a database record;
after deletion of the data, receiving a request for the database record in a main memory that comprises a plurality of partitions, where each partition from among the plurality of partitions comprises its own local index, and the request comprises an identifier of a query term that is recited in the database record;
identifying a local index of the partition in the main memory associated with the database record from among a plurality of local indices of the partition based on an identified type of the query term;
identifying a slice within the partition where data of the database record was stored prior to its deletion from among the plurality of slices included in the partition, where the slice is identified based on a value of the query term that is paired with a slice identifier of the slice within an entry of the identified local index of the respective partition; and
restoring, into the main memory, previously deleted data of a snapshot of only the identified slice from among the captured snapshots of the data stored at the plurality of slices previously captured and stored on disk during the checkpoint operation of the database.

15. The non-transitory computer readable medium of claim 14, wherein the snapshot of the identified slice comprises a copy of the slice content previously stored in the identified partition of the main memory.

16. The non-transitory computer readable medium of claim 14, wherein the snapshot of the identified slice is loaded into the main memory from a checkpoint of the identified slice previously stored on disk.

* * * * *